Nov. 8, 1960  E. P. DONNEY  2,958,885
CLEANING IMPLEMENT
Filed Nov. 14, 1956

INVENTOR.
EVERETT P. DONNEY
BY

United States Patent Office 2,958,885
Patented Nov. 8, 1960

2,958,885
CLEANING IMPLEMENT

Everett P. Donney, Laurens, Iowa, assignor to Fonda Investment Corporation, Fonda, Iowa, a corporation of Iowa Filed Nov. 14, 1956, Ser. No. 622,029

5 Claims. (Cl. 15—122)

This invention relates to scouring sponges and more particularly it is an object of this invention to provide an improved scouring sponge more particularly adapted for scouring action than sponges of the prior art.

Heretofore the most popular scouring devices have been made of metal, the most common being of stainless steel or brass. Such devices have had the disadvantage that they will not retain water whereby they are not as effective when used away from a sink.

The popular water retention devices, such as wash cloths, brushes and sponges, have the disadvantage that they are not sufficiently abrasive for scouring.

For these reasons it is the primary objective of my invention to provide a scouring device capable of retaining water for more efficiently doing many jobs and which embraces the cleaning, washing and scouring action of the sponge, brush, an abrasive scouring device and a dish-cloth.

The different articles for cleaning which are in general use today have features which contribute to inefficient washing, and in dairies and creameries this results in the build-up of milk stone from unremoved cooking matter which presents a health hazard, a very serious sanitation problem and necessitates expensive cleaning measures. It is an object to provide a device which will prevent the build-up of milk stone.

It is an objective to provide a scouring device which combines the water retention ability of a sponge without the sponge's disadvantage of becoming easily clogged and contaminated with food particles.

There is a further disadvantage of a sponge in that the life of the sponge is relatively short as a scouring action quickly disintegrates a sponge. A brush has the disadvantage that it misses considerable portions of the cleaning job at hand, again allowing milk stone formation to build up in dairy uses. A brush has a further inability to retain large quantities of cleaning solution, so that when a cleaning operator gets his brush to the cleaning object from a pail most of the solution has run off and he will have to clean with practically a dry brush.

Therefore it is an object of my invention to provide a scouring device which washes the surface of milk-holding tanks in dairies clean so that there are no milkstone or protein adherents, as cannot be removed with a sponge, a brush or any other known cleaning device. The economic importance of this is that this eliminates the necessity for the extra operation of an acid cleaning bath as has heretofore been necessary to remove the protein and milkstone formation.

A further object is to provide a cleaning device which is of a construction for keeping dirt and food particles out of the device and for retaining in its interior the liquid detergent or powder.

I have discovered that the placing of a fine mesh covering material around the sponge or water-retaining portion of the scouring device and under an outer scouring open mesh portion has the effect of retaining the washing solution in the sponge. This prevents a waste of washing solution as makes it possible to use my scouring device much greater periods of time between either dipping of water or refilling with detergent than has heretofore been possible, leading to great savings in labor costs in cleaning, and these advantages are further objectives of this invention.

A further object is to provide a cleaning device having a cover around the sponge portion to regulate the flow of the solution so that its flow is more uniform than is possible with a sponge alone and with which flow is far more uniform than is possible with a brush.

I have also discovered that a fine mesh cloth retainer around the sponge also prevents food particles from penetrating into the sponge portion. This is especially important for the sanitary use of a scouring pad in cleaning food containing and cooking equipment.

In the cleaning of cooking utensils there are sometimes two implements needed for rapid cleaning. A sponge or a dish cloth is used in addition to a scouring device. This means an investment in two articles to do one cleaning job as has considerable effect when the overall buying habits of the public and particularly of industry are concerned. Therefore it is an object of my invention to provide a scouring device which will do both of these cleaning jobs wtih one item.

Yet another object is to provide a cleaning device to which can be added a sterilizing agent whereby the device may be used to wash, scour and sterilize in one operation thereby reducing the bacteria and virus on unclean dishes, et cetera.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent princip'es may be used and structural changes may be made as desired by those skilled in the art without departing from the present invention and the purview of the appended claims.

Figure 1:
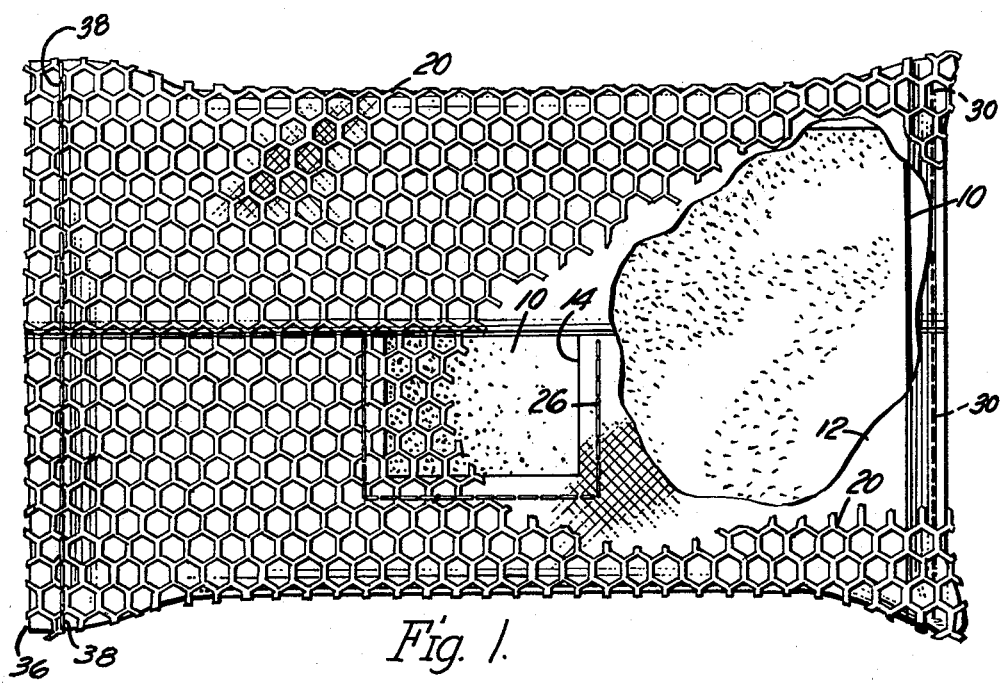
Figure 1 is a top plan view of the invention with portions broken away.
Figure 2:
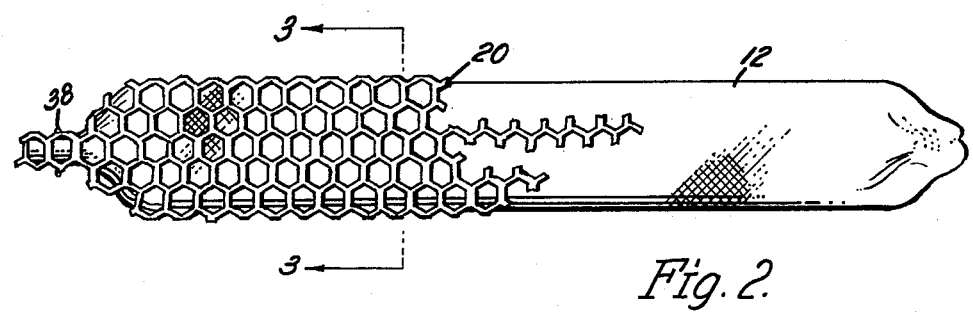
Figure 2 is a side elevation.
Figure 3:
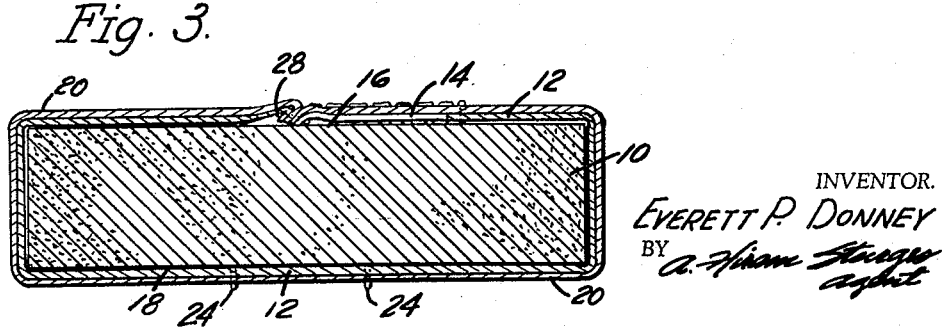
Figure 3 is a view-in-section as seen along the line 3—3 of Figure 2.

The cleaning device of this invention comprises an inner absorbent resilient member 10 which is preferably rectangular.

The inner member 10 is formed of rubber, plastic, cellulose or natural sponge or any other similar absorbent resilient material adapted to give out its water when squeezed or compressed. I much prefer synthetic sponges and find polyethylene foam to be best.

The member 10 is enclosed in a solution retaining cover 12 which is of a fine mesh having openings therethrough of a size for regulating or slowing down outflow of solution from the absorbent resilient inner member 10.

The cover 12 is also of a sufficiently fine mesh as to prevent substantial quantities of food particles from reaching the absorbent resilient inner member 10.

The retaining cover 12 has an aperture 14 therethrough for permitting insertion of cleaning solution into the inner member 10.

The aperture 14 is preferably on the upper side 16 of the device which is a larger side of the rectangular member 10 opposite its bottom 18.

The aperture 14 is preferably rectangular for minimizing fraying of the edges of the cover 12 at the aperture.

The retaining cover 12 is preferably formed of a non-absorbent material such as Dacron plastic material manufactured by E. I. du Pont de Nemours and Co., Wilmington, Delaware, a material which is substantially unstretchable, and in which the threads remain in normal position, during normal manual usage as a scouring device.

An outer scouring portion 20 is disposed around the outside of the retaining cover 12. The scouring portion 20 has a mesh relatively open as compared with that of the retainer cover 12.

In manufacture, the flat materials for the retaining cover 12 and the scouring portion 20 are laid out flat alongside each other and stitching them together with rows of stitches 24 from side to side along what will be the bottom. And also by stitches 26 around the aperture 14.

Next, the material is folded and sewed together by stitches 28 to hold the free edges together at what will be the top.

Then the one end of the folded materials is stitched closed by stitches 30 forming a bag.

The bag is then turned inside out and the absorbent resilient member 10 is inserted thereinto.

The other ends are folded inwardly at 36 and the open end is closed by transverse stitching at 38 to make a strong unitary product of a simplicity I found very, very difficult to conceive but marvelously easy to produce at low cost.

As thus described, it will be seen that in its preferred form, I have conceived a cleaning device in which substantially all or all materials are non-absorbent to prevent contamination of the materials themselves with foods and the like.

Further, I have found that it is preferable that the scouring portion 20 be formed of non-absorbent plastic material because it is less abrasive than metal, which latter harbors dangerous contamination. The scouring portion 20 is preferably formed of nylon plastic material made by the du Pont Company at the above address. It is my concept that the threads 24, 28, 30 and 38 should also be of non-absorbent material.

From the foregoing description it may be seen that there has been provided a cleaning implement which fulfills the intended objects and it is thought to be obvious that a cleaning implement constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A cleaning device comprising an absorbent resilient member for holding cleaning solution, a solution retaining cover disposed around said absorbent resilient member, said retaining cover being of a fine mesh having openings therethrough of a size for regulating and slowing down the outflow of solution from said absorbent resilient member and said cover also being of a sufficiently fine mesh so as to prevent substantial quantities of food particles from reaching said absorbent resilient member, said retaining cover having an aperture therethrough for permitting insertion of cleaning solution into said absorbent resilient member, and a scouring portion disposed outside of and attached to said retaining cover and formed of a material relatively open meshed as compared with said retaining cover for effective scouring.

2. A cleaning device comprising an absorbent resilient member for holding cleaning solution, a solution retaining cover disposed around said absorbent resilient member, said retaining cover being of fine mesh having openings therethrough of a size for regulating and slowing down the outflow of solution from said absorbent member and said cover also being of a sufficiently fine mesh so as to prevent substantial quantities of food particles from reaching said absorbent member, and a scouring portion disposed outside of and attached to said retaining cover and formed of a material relatively open meshed as compared with said retaining cover for effective scouring, said retaining cover being formed of a material which is substantially unstretchable during normal manual usage for resisting passage thereto of contaminating matter.

3. A combination of claim 2 in which the retaining cover is formed of "Dacron."

4. A cleaning device comprising an absorbent resilient member for holding cleaning solution, a solution retaining cover disposed around said absorbent resilient member, said retaining cover being of fine mesh having openings therethrough of a size for regulating and slowing down the outflow of solution from said absorbent member and said cover also being of a sufficiently fine mesh so as to prevent substantial quantities of food particles from reaching said absorbent member, and a scouring portion disposed outside of and attached to said retaining cover and formed of a material relatively open meshed as compared with said retaining cover for effective scouring, said retaining cover being formed of a material which is substantially unstretchable during normal manual usage as a scouring device for resisting passage thereto of contaminating matter and in which the threads remain in normal position during normal manual usage as a scouring device.

5. A cleaning device comprising an absorbent resilient member for holding cleaning solution, a cover for said absorbent resilient member, and a scouring portion disposed outside of and attached to said cover, said scouring portion being formed of a material relatively open mesh as compared to said cover for effective scouring, and the material of said cover being of a substantially closer mesh than said scouring portion for preventing substantial quantities of food particles and dirt from reaching said absorbent resilient member.

References Cited in the file of this patent

UNITED STATES PATENTS

| 1,991,559 | Kingman | Feb. 19, 1935 |

FOREIGN PATENTS

| 164,586 | Austria | Nov. 25, 1949 |
| 1,070,031 | France | Feb. 17, 1954 |